Patented Mar. 25, 1952

2,590,078

UNITED STATES PATENT OFFICE 2,590,078

PROCESS FOR THE MANUFACTURE OF THE CARBONYLS OF NICKEL

Arthur Maeder, Basel, Switzerland, assignor to Ciba Limited, Basel, Switzerland, a Swiss firm No Drawing. Application February 12, 1948, Serial No. 7,997. In Switzerland February 27, 1947

3 Claims. (Cl. 23—203)

According to this invention, nickel carbonyl is made in good yield by treating a compound of nickel in aqueous solution or suspension with carbon monoxide under superatmospheric pressure at a raised temperature in the presence of a sulfide or cyanide of nickel or in presence of a substance yielding a sulfide or a cyanide of nickel under the conditions of reaction, and also in the presence of a substance of alkaline reaction. Sulfur and sulfides, especially sulfides of alkali metals or alkaline earth metals, are examples of substances yielding sulfides of nickel under the reaction conditions. Cyanides of alkali metals or alkaline earth metals may be used as substances yielding cyanides of nickel. The sulfides and cyanides of nickel may be designated as salts which are difficultly soluble in water and have a molecular weight lying between 90 and 112.

The presence of sulfides or cyanides of nickel or of substances yielding these salts facilitates the formation of the metal carbonyl, so that in the present process the pressure of the carbon monoxide or the reaction temperature or both can be lower than would be the case in the absence of the said addition.

As nickel compounds there may be used nickel salts, especially those which are water-soluble, such as nickel chloride or nickel sulfate; and also oxides or hydroxides such as nickel hydroxide. There may also be used as starting materials nickel sulfide, or nickel cyanide, in which cases the further addition of a substance yielding a sulfide or a cyanide of nickel is unnecessary. It is of special advantage to use in the process of this invention a solution of a nickel salt, which has been obtained in the utilization of nickel carbonyl, and so to reconvert it into the corresponding metal carbonyl.

As substances of alkaline reaction there are especially suitable aqueous solutions of ammonia; but there may also be used other bases such as amines, calcium hydroxide, sodium hydroxide, potassium hydroxide or the like.

The process may be carried out by treating the nickel compound in aqueous solution or suspension at about 70–200° C., advantageously at 80–150° C., with carbon monoxide under superatmospheric pressure, for example, at 50–250 atmospheres and advantageously about 50–150 atmospheres, with the addition of the substances above referred to. When working with the addition of an alkali sulfide it is of advantage to use about 0.1–0.2 mol of alkali sulfide, for example, sodium sulfide, for each mol of the nickel compound. The quantity of the alkaline substance of the kind above referred to should be at least sufficient to bind the acid formed in the synthesis of the carbonyl from the salt, for example, at least 2 mols of ammonia for each mol of a divalent nickel salt.

The following examples illustrate the invention, the parts being by weight unless otherwise stated, and the relationship of parts by weight to parts by volume being the same as that of the kilogram to the litre:

*Example 1*

240 parts of crystalline nickel chloride $(NiCl_2+6H_2O)$ are dissolved in 250 parts of warm water, and then a solution of 48 parts of crystalline sodium sulfide $(Na_2S+9H_2O)$ in 180 parts of an aqueous ammonia solution of 20 per cent. strength is added. The mixture is heated for 20 hours at 80–85° C. under a pressure of carbon monoxide of 100–130 atmospheres in a rotary autoclave, which may be composed, for example, of chrome-nickel steel. After cooling, the pressure is slowly released, and the gaseous mixture issuing from the pressure vessel is washed with dilute sulfuric acid, dried with soda lime and calcium chloride, and then partially condensed in two receivers strongly cooled by means of acetone-carbon dioxide snow. The rest of the carbonyl which remains in the autoclave after releasing the pressure is then volatilized by means of a current of nitrogen, and condensed in the apparatus described above. There are obtained 156–160 parts of nickel carbonyl, and the solution which remains in the autoclave is practically free from nickel (nickel content=0.004 per cent.). A small part of the nickel carbonyl formed escapes condensation in the above apparatus. The yield of nickel carbonyl condensed amounts to 90–92 per cent. of the theoretical yield.

*Example 2*

A mixture of 240 parts of $NiCl_2+6H_2O$, 180 parts of aqueous ammonia solution of 20 per cent. strength, and 24 parts of sodium sulfide is treated for 22 hours at 150° C. under a pressure of carbon monoxide of 50–100 atmospheres in a rotary autoclave. By the method of working up described in Example 1, there are obtained 146 parts of $Ni(CO)_4$, which corresponds to a yield amounting to 84 per cent. of the theoretical yield.

*Example 3*

281 parts of crystalline nickel sulfate ($NiSO_4 + 7H_2O$; 1 mol) are dissolved in 800 parts of water and mixed with a solution of 65 parts of potassium cyanide (1 mol) and 168 parts of potassium hydroxide (3 mols) in 200 parts of water. The resulting suspension is treated in a rotary autoclave for 20 hours at a temperature of 80° C. and under a pressure of carbon monoxide of 200 atmospheres.

After cooling, there are obtained by condensation with strong cooling from the gaseous mixture issuing from the pressure vessel when the pressure is released 136.5 parts of $Ni(CO)_4$, which corresponds to a yield amounting to 79 per cent. of the theoretical yield.

Having thus described the invention, what is claimed is:

1. A process for the manufacture of nickel carbonyl, which comprises heating a mixture produced by the action of an alkaline reacting substance selected from the group consisting of ammonia and alkali metal hydroxides upon a nickel salt and a member selected from the group consisting of nickel sulfide and nickel cyanide in an aqueous alkaline medium with carbon monoxide under a pressure range from 50 to 200 atmospheres to a temperature of 70–200° C.

2. A process for the manufacture of nickel carbonyl, which comprises heating a mixture produced by the action of ammonia upon a nickel salt and nickel sulfide in an aqueous alkaline medium with carbon monoxide under a pressure range from 50 to 200 atmospheres to a temperature of 70–200° C.

3. A process for the manufacture of nickel carbonyl, which comprises heating a mixture produced by the action of potassium hydroxide upon a nickel salt and nickel cyanide in an aqueous alkaline medium with carbon monoxide under a pressure range from 50 to 200 atmospheres to a temperature of 70–200° C.

ARTHUR MAEDER.

REFERENCES CITED

The following references are of record in the file of this patent:

UNITED STATES PATENTS

| Number | Name | Date |
| --- | --- | --- |
| 1,909,762 | Grieb | May 16, 1933 |
| 2,548,727 | Kincaid | Apr. 10, 1951 |

FOREIGN PATENTS

| Number | Country | Date |
| --- | --- | --- |
| 327,956 | Great Britain | Apr. 14, 1930 |